United States Patent
Kreeger

(10) Patent No.: US 10,147,183 B2
(45) Date of Patent: Dec. 4, 2018

(54) METHODS AND SYSTEMS FOR STOCHASTIC GROWTH ASSESSMENT

(71) Applicant: FOVIA, INC., Palo Alto, CA (US)

(72) Inventor: Kevin Kreeger, Palo Alto, CA (US)

(73) Assignee: FOVIA, INC., Palo Alto, CA (US)

( * ) Notice: Subject to any disclaimer, the term of this patent is extended or adjusted under 35 U.S.C. 154(b) by 126 days.

(21) Appl. No.: 15/357,712

(22) Filed: Nov. 21, 2016

(65) Prior Publication Data

US 2017/0148160 A1    May 25, 2017

Related U.S. Application Data

(60) Provisional application No. 62/260,167, filed on Nov. 25, 2015.

(51) Int. Cl.
   *G06T 7/00*     (2017.01)
   *G06T 7/277*    (2017.01)
   *G06T 7/254*    (2017.01)

(52) U.S. Cl.
   CPC .......... *G06T 7/0012* (2013.01); *G06T 7/0016* (2013.01); *G06T 7/254* (2017.01); *G06T 7/277* (2017.01); *G06T 2207/10028* (2013.01); *G06T 2207/10081* (2013.01); *G06T 2207/20076* (2013.01); *G06T 2207/30064* (2013.01)

(58) Field of Classification Search
   CPC ..... G06T 7/0012; G06T 7/0016; G06T 7/254; G06T 7/277; G06T 7/97; G06T 2207/20076; A61B 6/486; A61B 6/5217; G16H 30/40; G16H 50/20
   See application file for complete search history.

(56) References Cited

U.S. PATENT DOCUMENTS

| | | | |
|---|---|---|---|
| 2011/0216951 A1 | 9/2011 | Ye et al. | 382/128 |
| 2013/0182901 A1* | 7/2013 | Ishida et al. | G06T 7/0012 382/103 |
| 2014/0225887 A1 | 8/2014 | Aguirre-Valencia | G06T 15/00 |

OTHER PUBLICATIONS

International Search Report and Written Opinion received for PCT Patent Application No. PCT/US2016/063111, dated Feb. 16, 2017, 8 pages.
International Preliminary Report on Patentability received for PCT Application No. PCT/US2016/063111, dated Jun. 7, 2018, 7 pages.

* cited by examiner

*Primary Examiner* — Andrew W Johns
(74) *Attorney, Agent, or Firm* — Dentons US LLP

(57) ABSTRACT

Methods and systems related to variation assessment of a first 3D object are provided. In some embodiments, a computer system obtains a first dataset and a second dataset. The first dataset represents data associated with a first evaluation of the first 3D object and the second dataset represents data associated with a second evaluation of the first 3D object. The computer system determines a first metric based on the first dataset and a second metric based on the second dataset. The first and second metrics represent distributions of probabilities with respect to values associated with the characteristic of the first 3D object at the first and second evaluations, respectively. The computer system further provides, based on the first metric and the second metric, an assessment of the first 3D object variation between the first evaluation and the second evaluation.

28 Claims, 12 Drawing Sheets

METHODS AND SYSTEMS FOR STOCHASTIC GROWTH ASSESSMENT

CROSS-REFERENCE TO RELATED APPLICATIONS

This application claims priority to U.S. Provisional Patent Application Ser. No. 62/260,167, filed on Nov. 25, 2015, entitled "METHODS AND SYSTEMS FOR STOCHASTIC GROWTH ASSESSMENT," which is hereby incorporated by reference in its entirety for all purposes.

FIELD

The present disclosure relates generally to image processing. More particularly, the present disclosure relates to stochastic variation assessment of a three-dimensional object.

BACKGROUND

A radiologist may frequently need to determine a size of, for example, a nodule using computed tomography (CT) scan images. A nodule may have a smaller size than the size of other structures represented in the CT scan image. For example, FIG. 1A illustrates an exemplary CT scan image 100 of a lung slice. A CT scan image represents an axial or cross-sectional image of a three-dimensional (3D) object, such as a human body. The axial or cross-sectional images represent datasets associated with virtual slices (referred as "slices" hereinafter) of the 3D object. As shown in FIG. 1A, in CT scan image 100, representation 102 is a dot or circle that represents a lung nodule.

Measuring the size of a 3D object, such as long nodule, can provide useful or important information for diagnosis purposes. For example, a radiologist can measure the size of a long nodule at different time points to determine whether the long nodule has grown over time and thus determine whether further medical procedures are required. Determining the size of a 3D object such as a lung nodule can be challenging due to its small size. For example, a nodule may be only a few voxels in diameter and thus difficult to measure. A voxel is a basic element of a 3D image and can have a value on a voxel grid in a 3D image.

Determining the size of a 3D object such as a lung nodule can also be challenging due to the partial volume effect generated by the CT scan system. FIG. 1B illustrates an exemplary voxel grid 120 corresponding to a lung nodule and its surrounding structures. As shown in FIG. 1B, each voxel of voxel grid 120 is represented by a square and is associated with a voxel value. A voxel value can be a density value represents the amount of density of tissues or matters at the voxel's location. A CT scan system can provide the density values of tissues or matters of a lung nodule and its surrounding structures. For example, the air surrounding a lung nodule may have a density value or voxel value of 0 Hounsfield units (HU), while tissues or matters inside the lung nodule may have a density value or voxel value of 100 HU.

In providing the density values of a voxel grid, a CT scan system may also provide values other than 0 HU or 100 HU due to sampling effect and/or mathematical filtering effect. For example, a CT scan system may provide voxel values such as 40, 50, 60, 80, and 97 HU associated with some voxels located between voxels having 0 HU or 100 HU. These voxel values, however, may or may not correspond to tissue or matters of a real structure. As a result, a CT scan system may not provide voxel values that differentiate between the air and tissues or between different tissues. This is referred to as the partial volume effect. The partial volume effect generated by the CT scan system makes it difficult to determine the accurate size of a nodule. For example, in FIG. 1B, it is uncertain whether the size of the nodule corresponds to the size of the voxels with values of 100 HU, the size of the voxels with non-zero voxel values, the size of the voxels having values that are greater than or equal a middle density value between 0 HU and 100 HU, or the size of the voxels having values that are greater than or equal a weighted sum of the non-zero voxels.

The uncertainty or inaccuracy associated with the partial volume effect may become more problematic when the radiologist attempts to determine the variation of the nodule by measuring the size of the nodule using data from a prior CT scan and the size of the nodule using data from a subsequent CT scan. Because both measurements can be inaccurate, the measurement of the nodule variation can be even more inaccurate. With inaccurate variation data, a radiologist can have difficulty in determining whether further medical procedures should be prescribed.

SUMMARY

Methods and systems related to variation assessment of a first 3D object are provided. In some embodiments, a computer system obtains a first dataset and a second dataset. The first dataset represents data associated with a first evaluation of the first 3D object and the second dataset represents data associated with a second evaluation of the first 3D object. The computer system determines a first metric based on the first dataset. The first metric represents a distribution of probabilities with respect to values associated with a characteristic of the first 3D object at the first evaluation. The computer system further determines a second metric based on the second dataset. The second metric represents a distribution of probabilities with respect to values associated with the characteristic of the first 3D object at the second evaluation. The computer system further provides, based on the first metric and the second metric, an assessment of the first 3D object variation between the first evaluation and the second evaluation.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The details of one or more embodiments of the subject matter described in the specification are set forth in the accompanying drawings and the description below. Other features, aspects, and advantages of the subject matter will become apparent from the description, the drawings, and the claims.

DETAILED DESCRIPTION

The following description sets forth exemplary systems and methods for variation assessment of a first 3D object. It should be recognized, however, that such description is not intended as a limitation on the scope of the present disclosure but is instead provided as a description of exemplary embodiments.

Figure 1A:
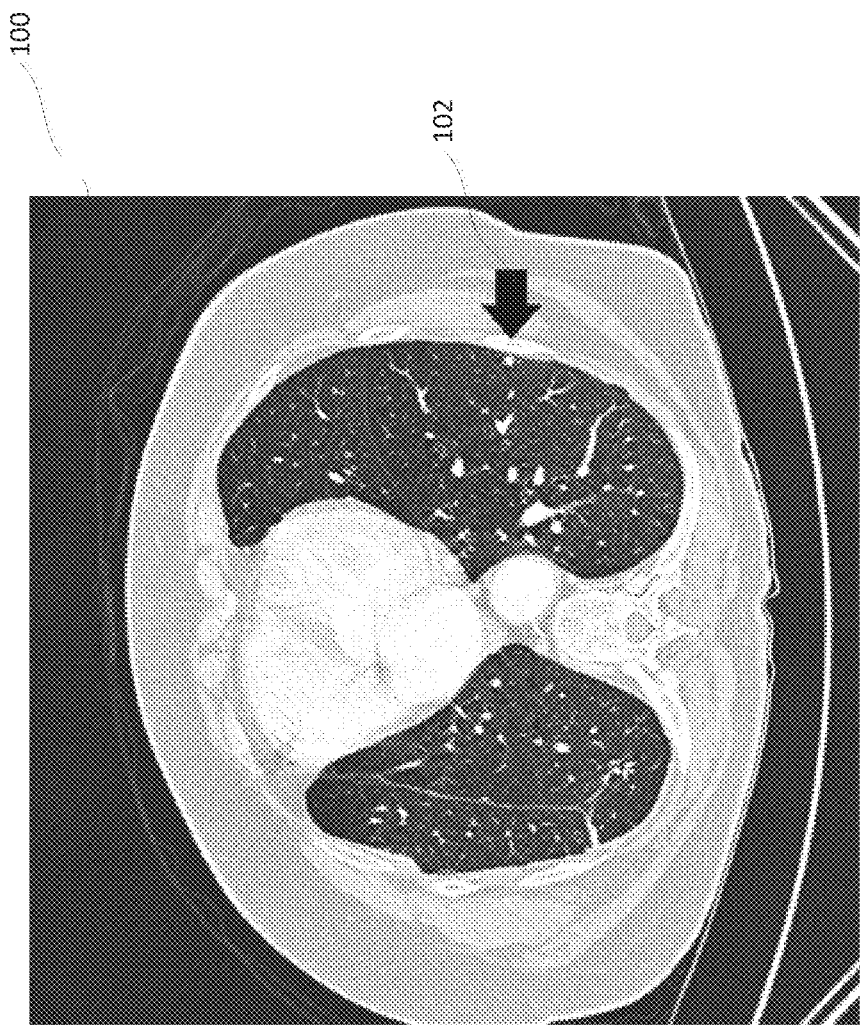
FIG. 1A illustrates an exemplary CT scan image of a lung slice.
Figure 1B:
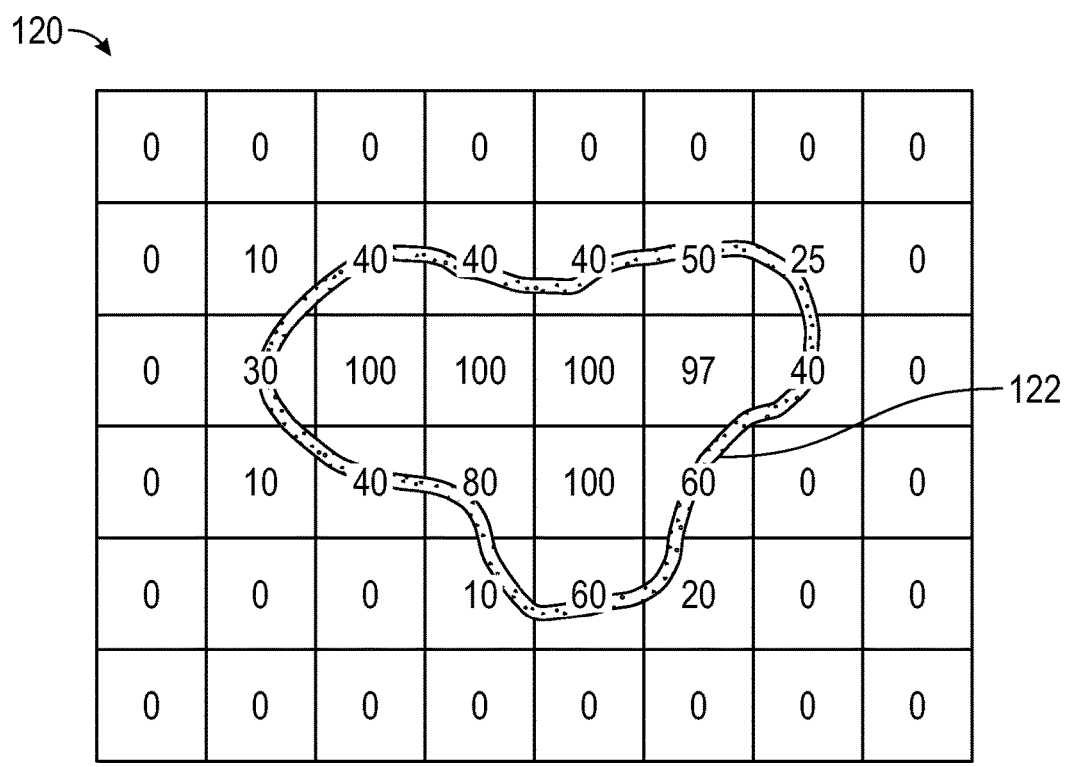
FIG. 1B illustrates an exemplary voxel grid corresponding a three-dimensional object and its surrounding structure.
Figure 2:
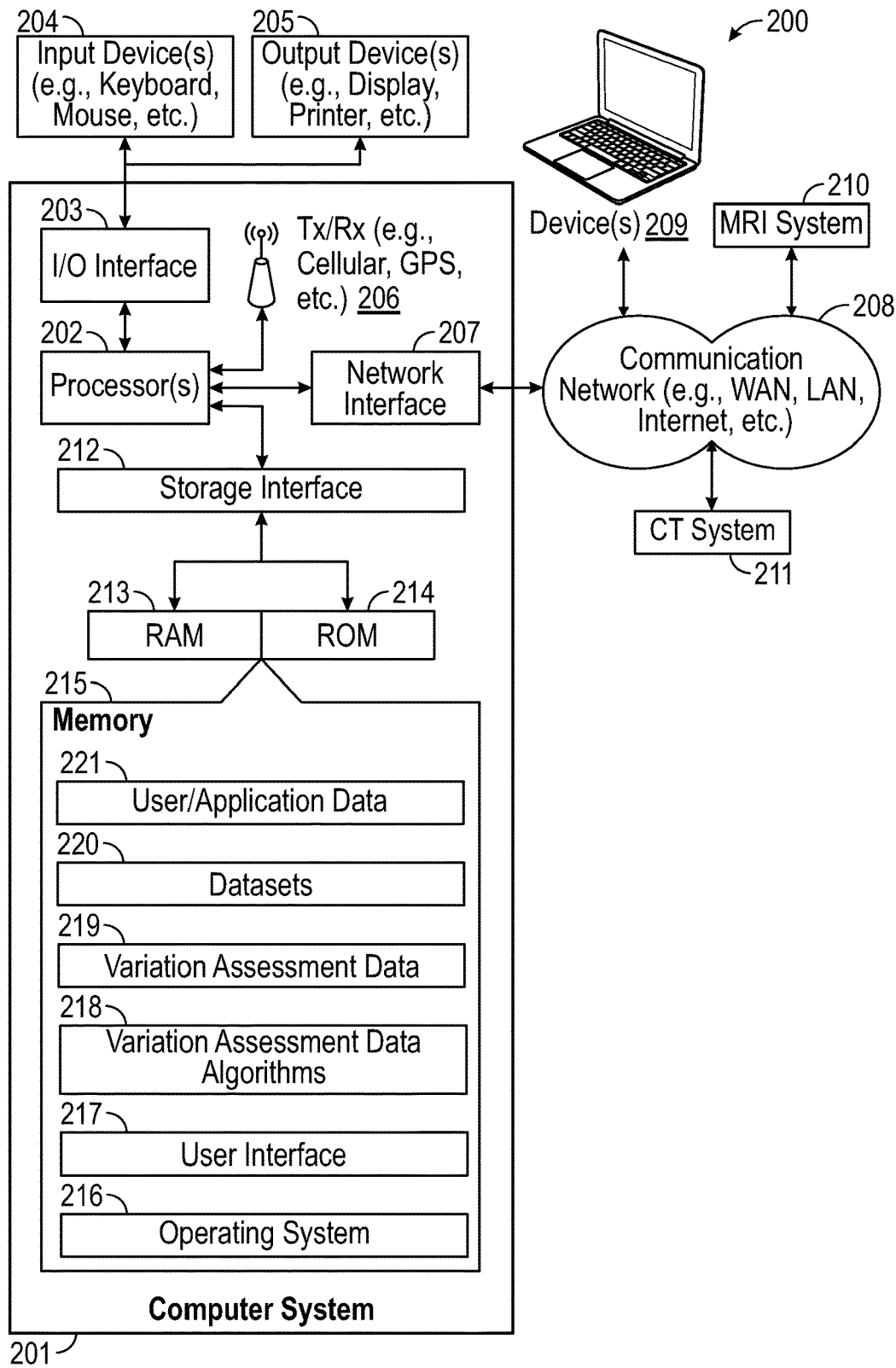
FIG. 2 illustrates an exemplary system for variation assessment of a first 3D object, consistent with some embodiments of the present disclosure.

FIG. 2 illustrates an exemplary system 200 for variation assessment of a first 3D object, consistent with some embodiments of the present disclosure. Variation assessment in the present disclosure can be performed in a stochastic manner to allow a statistical analysis. For example, the variation assessment can be based on the determination of distribution of probabilities with respect to different values of a characteristic of the first 3D object (e.g., different size values of a nodule) at a first evaluation (e.g., a prior CT scan) and a second evaluation (e.g., a subsequent CT scan). The variation assessment can provide a probability variation distribution function, which represents the probabilities that the characteristic of the first 3D object has corresponding variations for different variation values. As a result, precise or accurate measurements of the characteristic (e.g., the size) of the first 3D object may not be required. Provided with the variation assessment, a radiologist can have improved data for determining more accurately whether the first 3D object may have varied by a certain amount and whether such variation may require further medical treatments.

Referring to FIG. 2, system 200 may include a computer system 201, input devices 204, output devices 205, devices 209, Magnet Resonance Imaging (MRI) system 210, and Computed Tomography (CT) system 211. It is appreciated that one or more components of system 200 can be separate systems or can be integrated systems. In some embodiments, computer system 201 may comprise one or more central processing units ("CPU" or "processor(s)") 202. Processor(s) 202 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor(s) 202 may be disposed in communication with one or more input/output (I/O) devices via I/O interface 203. I/O interface 203 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 203, computer system 201 may communicate with one or more I/O devices. For example, input device 204 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, electrical pointing devices, etc. Output device 205 may be a printer, fax machine, video display (e.g., cathode ray tube (CRT), liquid crystal display (LCD), light-emitting diode (LED), plasma, or the like), audio speaker, etc. In some embodiments, a transceiver 206 may be disposed in connection with the processor(s) 202. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor(s) 202 may be disposed in communication with a communication network 208 via a network interface 207. Network interface 207 may communicate with communication network 208. Network interface 207 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 208 may include, without limitation, a direct interconnection, local area network (LAN), wide area network (WAN), wireless network (e.g., using Wireless Application Protocol), the Internet, etc. Using network interface 207 and communication network 208, computer system 201 may communicate with devices 209. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 201 may itself embody one or more of these devices.

In some embodiments, using network interface 207 and communication network 208, computer system 201 may communicate with MRI system 210, CT system 211, or any other medical imaging systems. Computer system 201 may communicate with these imaging systems to obtain images for variation assessment. Computer system 201 may also be integrated with these imaging systems.

In some embodiments, processor 202 may be disposed in communication with one or more memory devices (e.g., RAM 213, ROM 214, etc.) via a storage interface 212. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, flash devices, solid-state drives, etc.

The memory devices may store a collection of program or database components, including, without limitation, an operating system 216, user interface application 217, variation assessment algorithms 218, variation assessment data 219, datasets 220, user/application data 221 (e.g., any data variables or data records discussed in this disclosure), etc. Operating system 216 may facilitate resource management and operation of computer system 201. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

User interface application 217 may facilitate display, execution, interaction, manipulation, or operation of program components through textual or graphical facilities. For example, user interfaces may provide computer interaction interface elements on a display system operatively connected to computer system 201, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 201 may implement one or more variation assessment algorithms 218. Variation assessment algorithms 218 can include, for example, algorithms for determining a probability distribution function (PDF), algorithms for determining a cumulative distribution function (CDF), and algorithms for determining probability variation distribution functions. The PDF, CDF, and probability variation distribution functions are described in more detail below.

In some embodiments, computer system 201 can store variation assessment data 219 and datasets 220 in memory 215. Datasets 220 can include, for example, sets of voxel values associated with multiple evaluations of the first 3D object. Variation assessment data 219 can include, for example, process data generated during the determination of PDFs, CDFs, and probability variation distribution functions.

In some embodiments, computer system 201 may store user/application data 221, such as data and variables as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Disclosed embodiments describe systems and methods for variation assessment of a first 3D object. The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

Figure 3A:
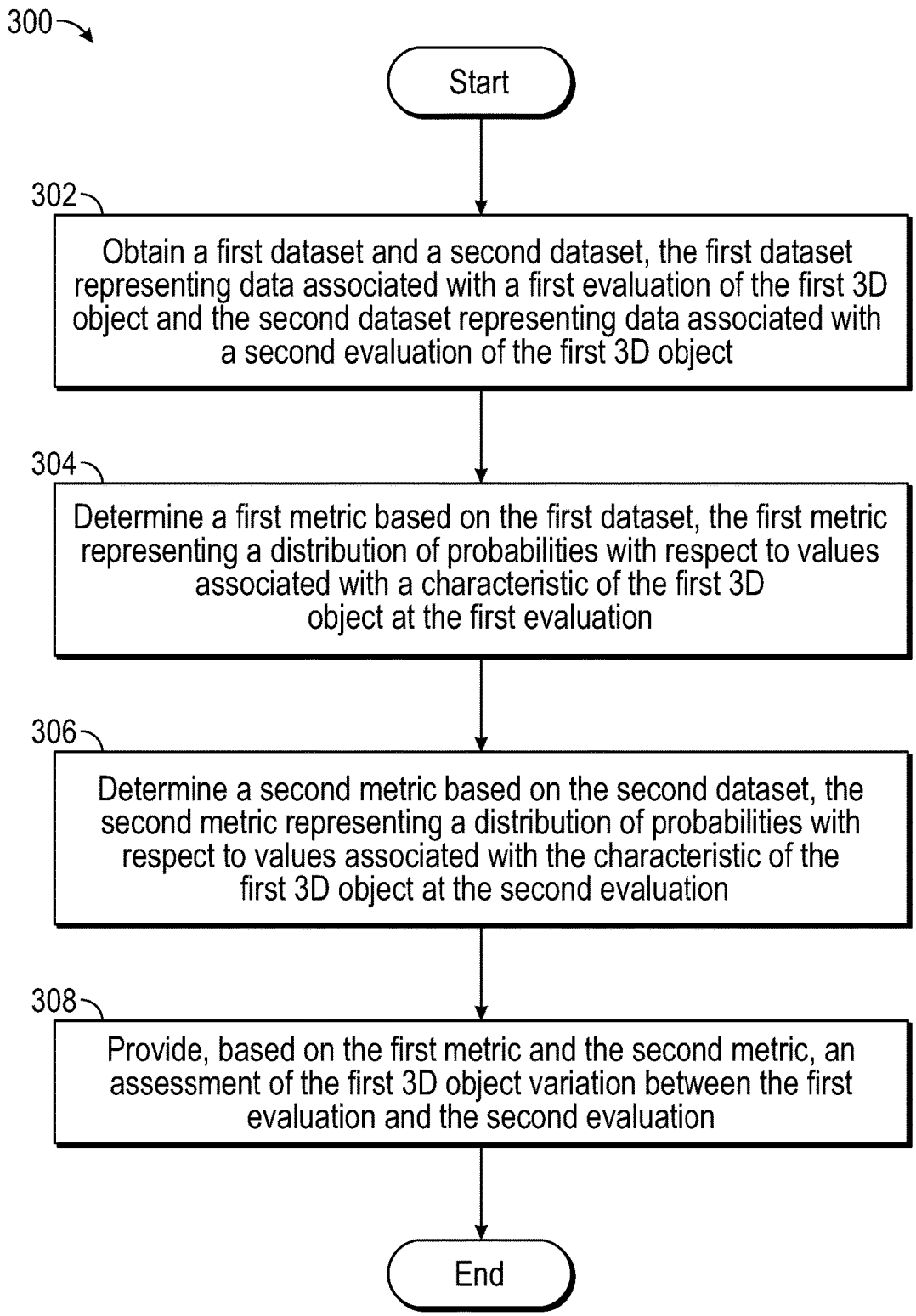
FIG. 3A illustrates a flow chart of an exemplary process for variation assessment of a first 3D object, consistent with some embodiments of the present disclosure.

FIG. 3A illustrates a flow chart of an exemplary process 300 for variation assessment of a first 3D object, consistent with some embodiments of the present disclosure. In process 300, a computer system (e.g., computer system 201) can obtain (step 302) a first dataset and a second dataset. In some embodiments, the first dataset may represent data associated with a first evaluation of the first 3D object and the second dataset may represent data associated with a second evaluation of the first 3D object.

The first 3D object can be, for example, an abnormality of a human body or an animal body, an aggregation of cells, a nodule, and/or a tumor. The first 3D object may be a portion of a second 3D object, which can be a portion of a human body, a portion of an animal body, or a lifeless object. In some embodiments, the first dataset comprises a plurality of voxel values generated at a first evaluation of the first 3D object; and the second dataset comprises a plurality of voxel values generated at a second evaluation of the first 3D object.

Figure 3B:
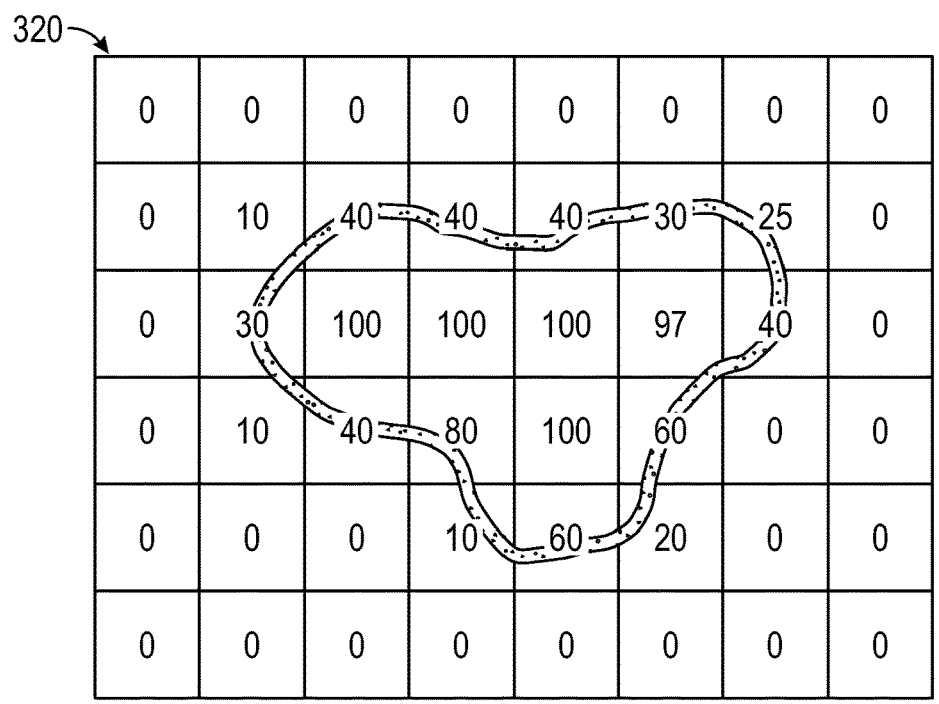
FIG. 3B illustrates an exemplary first voxel grid providing a first dataset representing data associated with a first evaluation of a first 3D object, consistent with some embodiments of the present disclosure.

For example, a CT system (e.g., CT system 211) can perform a scan of a patient at a first evaluation (e.g., a physical examination at a first time point) and generate a first voxel grid. FIG. 3B illustrates an exemplary first voxel grid 320, which provides a plurality of voxel values. The voxel values may represent density values of the first 3D object (e.g., a lung nodule) and its surrounding structures (e.g., air) at the first evaluation. As shown in FIG. 3B, the voxel values provided by first voxel grid 320 may range from 0 HU to 100 HU, with 0 HU corresponds to the density of air and 100 HU corresponds to the density of tissues or matters of the first 3D object (e.g., a lung nodule).

Figure 3C:
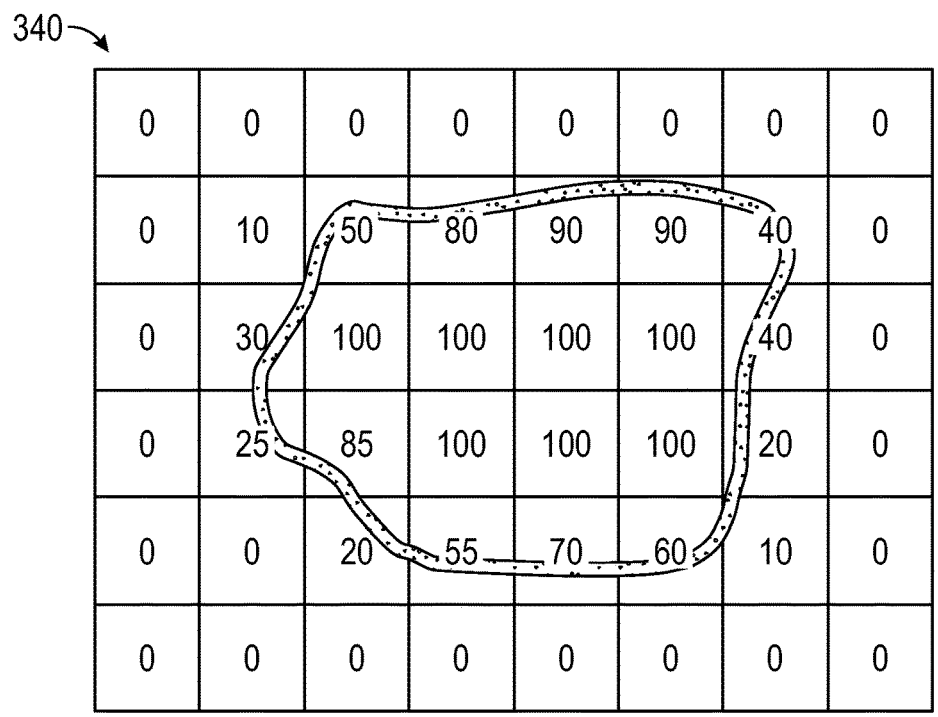
FIG. 3C illustrates an exemplary second voxel grid providing a second dataset representing data associated with a second evaluation of a first 3D object, consistent with some embodiments of the present disclosure.

Similarly, the CT system (e.g., CT system 211) can perform a scan of the same patient at a second evaluation (e.g., a physical examination at a subsequent or second time point) and generate a second voxel grid. FIG. 3C illustrates an exemplary second voxel grid 340, which provides a plurality of voxel values. The voxel values may represent density values of the first 3D object and its surrounding structures at the second evaluation. As shown in FIG. 3B, the voxel values provided by second voxel grid 340 may range from 0 HU to 100 HU, with 0 HU corresponds to the density of air and 100 HU corresponds to the density of tissues or matters of the first 3D object (e.g., a lung nodule).

In some embodiments, the CT system can provide the computer system (e.g., computer system 201) with the first dataset (e.g., the voxel values generated at the first evaluation) and the second dataset (e.g., the voxel values generated at the second evaluation). In some embodiments, after obtaining the first dataset and the second dataset, the computer system can verify that one or both of the first dataset and the second dataset represent Bernoulli distribution or a probability distribution of a random variable. For example, the computer system can verify that in the first dataset and the second dataset, the voxel values between a background voxel value (e.g., 0 HU corresponding to air surrounding the first 3D object) and a lesion voxel value (e.g., 100 HU corresponding to matters or tissues of the first 3D object) follow a Bernoulli or random distribution.

In some embodiments, the computer system can also obtain the background voxel value and the lesion voxel value. For example, a user and/or a CT system can provide the desired background voxel value and the lesion voxel value to the computer system for variation assessment. The background voxel value may represent the minimum allowable or defined voxel value in a dataset and the lesion voxel value may represent the maximum allowable or defined voxel value in the dataset. The background voxel value and the lesion voxel value can be, for example, 0 HU and 100 HU, respectively, or any desired values.

Referring back to FIG. 3A, after the computer system obtains the first dataset and the second dataset, it can determine (step 304) a first metric based on the first dataset and determine (step 306) a second metric based on the second dataset. In some embodiments, determining the first metric comprises determining a first probability distribution function (PDF) based on the first dataset; and determining the second metric comprises determining a second PDF based on the second dataset.

Figure 4A:
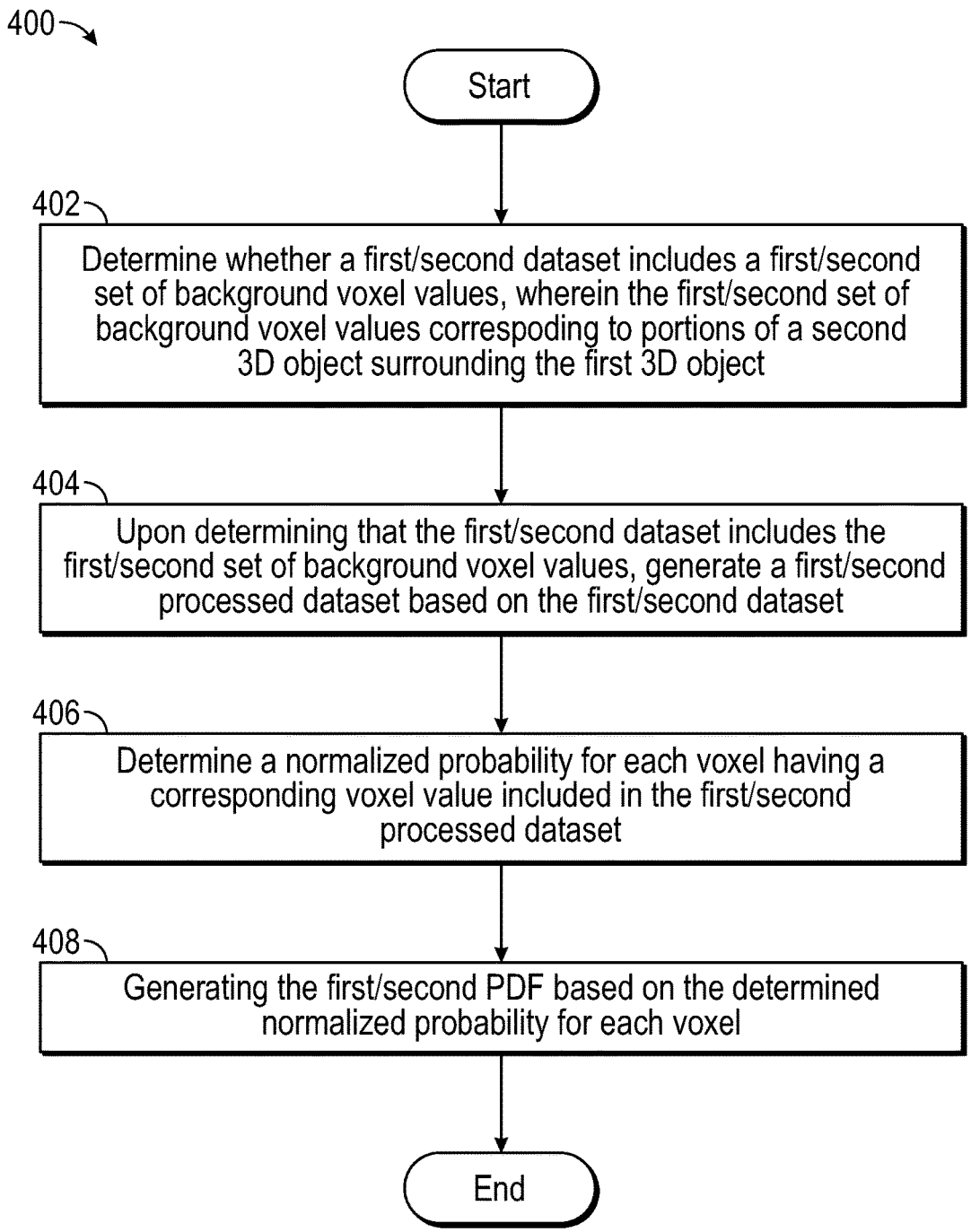
FIG. 4A illustrates a flow chart of an exemplary process for determining a probability distribution function, consistent with some embodiments of the present disclosure.
Figure 4B:
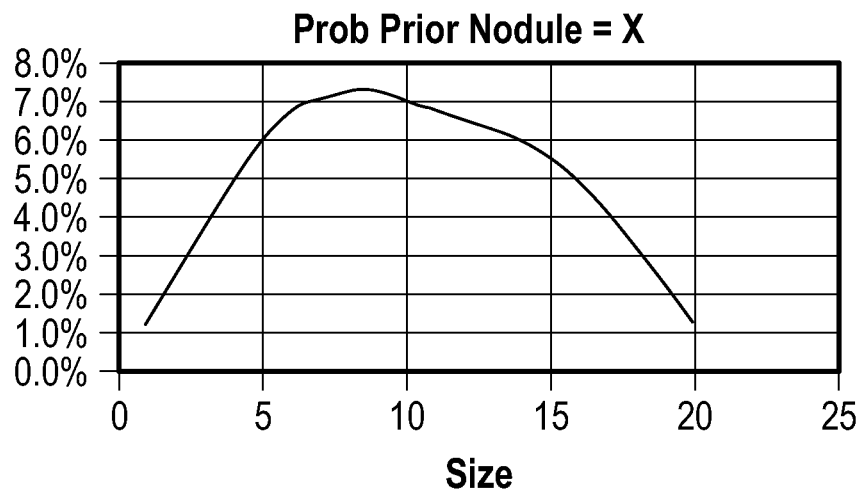
FIG. 4B illustrates exemplary first and second probability distribution functions determined based on the first dataset and the second dataset, respectively.
Figure 4B:
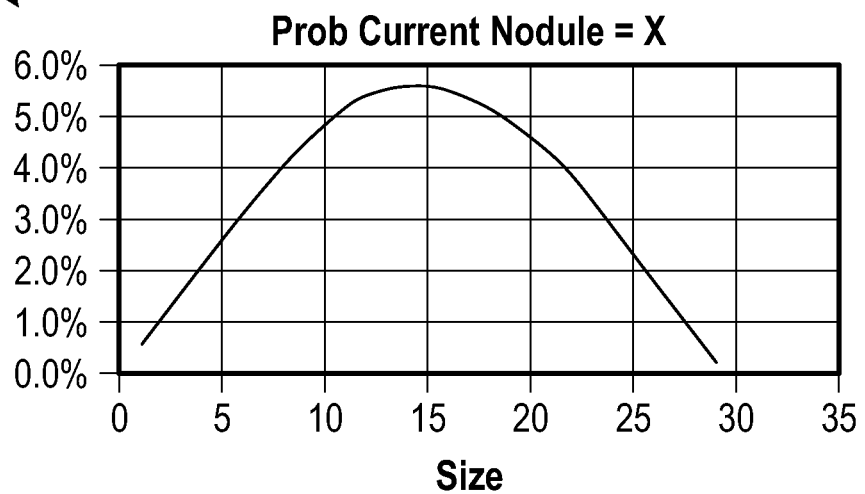

FIG. 4A illustrates a flow chart of an exemplary process 400 for determining a PDF, consistent with some embodiments of the present disclosure. FIG. 4B illustrates exemplary first PDF 420 and second PDF 440 determined based on the first dataset and the second dataset, respectively. A PDF can provide probabilities that a characteristic (e.g., size, area, or volume) of the first 3D object has corresponding values. For example, a PDF can provide that the probability of a first 3D object having a size of 5 mm is 6%; the probability of a first 3D object having a size of 7 mm is 7%, so forth. The characteristic of the first 3D object is not limited to the size of the first 3D object, but can be the size, the area, or the volume of the first 3D object. For example, the characteristic may include a linear diameter of a two-dimensional (2D) slice that intersects the first 3D object, a maximum diameter of the first 3D object, a maximum area of a 2D slice that intersects the first 3D object, or a volume of the first 3D object.

As shown in FIG. 4A, in some embodiments, a computer system (e.g., computer system 201) can determine (step 402) whether the first dataset includes a first set of background voxel values. As discussed above, the background voxel values may represent the minimum allowable or defined voxel values in a dataset. For example, if the background voxel value represents the density of air, a CT system may indicate that the background voxel value is 0 HU. In some embodiments, the computer system can verify that the first dataset includes background voxel values that correspond to portions of a second 3D object surrounding the first 3D object. For example, referring back to FIG. 3B, a first dataset can include the voxel values provided by first voxel grid 320, and represent data associated with a first evaluation of the first 3D object. As shown in FIG. 3B, the first dataset includes a plurality of 0 HU voxel values, which may correspond to known or defined background voxels (e.g., voxels representing air). The computer system can verify that these known or defined background voxels completely surround the non-background voxels. As an example, if background voxels completely surround the non-background voxels, it can indicate that background matters (e.g., air) completely surround non-background matters (e.g., tissues or matters of a lung nodule). As a result, the computer system can verify that the first dataset includes a complete dataset associated with the first 3D object. If background voxels does not completely surround the non-background voxels, it can indicate that background matters (e.g., air) do not completely surround non-background matters (e.g., tissues or matters of a lung nodule). As a result, the first dataset may not include a complete dataset associated with the first 3D object, and the computer system may request, for example, the CT system to provide a more complete dataset.

Referring to FIG. 4A, upon determining that the first dataset includes a first set of background voxels, the computer system can generate (step 404) a first processed dataset based on the first dataset. In some embodiments, for generating the first processed dataset, the computer system can sort the voxel values included in the first dataset. For example, the computer system can sort the voxel values from the highest to the lowest. Referring back to FIG. 3B, the computer system can sort the voxel values in first voxel grid 320 as 100, 100, 100, 100, 97, 80, 60, 60, 50, 40, 40, 40, 40, 30, 25, 20, 10, 10, 10, 0, 0, . . . 0.

In some embodiments, the voxel values of the first dataset may include values that are greater than a first threshold voxel value (e.g., the known or defined lesion voxel value such as 100 HU) and/or less than a second threshold voxel value (e.g., the known or defined background voxel value such as 0 HU). Thus, the computer system can remove or clamp any voxel values that are greater than the first threshold voxel value and any voxel values that are less than the second threshold voxel value, using the sorted or unsorted voxel values included the first dataset. In some embodiments, after sorting and clamping the voxel values, the computer system can generate the first processed dataset.

Referring to FIG. 4A, the computer system can determine (step 406) a normalized probability for each voxel having a corresponding voxel value included in the first processed dataset. In some embodiments, for determining such normalized probability, the computer system can determine a probability for each voxel based on the corresponding voxel value included in the first processed dataset. For example, if the voxel values included in the first processed dataset represent a Bernoulli distribution, the computer system can determine a probability that a particular voxel may represent a portion of the first 3D object (e.g., the probability of voxel representing a matter or tissue that is 100% inside a nodule) using the following formula (1).

$$P1(i)=(\text{VOXEL\_VALUE}(i)-\text{BACKGROUND\_VOXEL\_VALUE}(i))/(\text{LESION\_VOXEL\_VALUE}(i)-\text{BACKGROUND\_VOXEL\_VALUE}(i)) \qquad (1)$$

As an example, according to formula (1), if a background voxel value is 0 HU, a lesion voxel value is 100 HU, and a particular voxel has a voxel value of 80, the probability that this particular voxel represents a matter or tissue that is part of a nodule may be 0.8 or 80%.

In some embodiments, after determining that the probability of each voxel may represent a portion of the first 3D object, the computer system can shift the probability to a 100% confidence level that the particular voxel represents or does not represent a portion of the first 3D object (e.g., the particular voxel represents matters inside a nodule or outside of a nodule). In some embodiments, the computer system can shift the probability to a 100% confidence level by subtracting 0.5 from the probability and then multiplying by 2. By shifting the probability to a 100% confidence level, a voxel value that is less than a midpoint between the background voxel value (e.g., 0 HU) and the lesion voxel value (e.g., 100 HU) may have a negative probability value and thus contribute negatively for determining the PDF; and a voxel value that is greater than a midpoint between the background voxel value (e.g., 0 HU) and the lesion voxel value (e.g., 100 HU) may have a positive probability value and thus contribute positively for determining the PDF. A negative probability value may indicate that the corresponding voxel does not represent a portion inside the first 3D object. A positive probability value may indicate that the corresponding voxel represents a portion inside the first 3D object. Continuing the above example, for a voxel value of 80 HU, the shifted probability at a 100% confidence level may be (0.8−0.5)*2=0.6 or 60%. As another example, for a voxel value of 40 HU, the shifted probability at a 100% confidence level may be (0.4−0.5)*2=−0.2 or −20%. As another example, for the background voxel value of 0 HU, the shifted probability at a 100% confidence level may be (0−0.5)*2=−1 or −100%. Thus, the shifted probability for the background voxel value may indicate that the corresponding voxel is 100% not a portion inside the first 3D object. In some embodiments, the computer system can determine a normalized probability for each voxel based on the shifted probability. It is appreciated that the computer system can also use other methods or formulas for shifting and normalizing the probability.

In some embodiments, based on the normalized probability for each voxel, the computer system can determine (step 408) the first PDF that provides probabilities that a characteristic of the first 3D object has corresponding values at the first evaluation. As discussed above, the characteristic of the first 3D object can be the size, the area, or the volume of the first 3D object. For example, the computer system can calculate probabilities that the first 3D object has a size of 5 mm, 10 mm, 15 mm, etc. Referring back to FIG. 3B, as an example, the first 3D object having a size of 5 mm may correspond to a set of voxels having voxel values that are greater than or equal to the middle voxel value between 0 HU and 100 HU (e.g., voxels having values of 100, 97, 80, 60, and 50 HU). In some embodiments, to obtain the probability that first 3D object has a particular size (e.g., 5 mm), the computer system can sum the normalized probabilities of the voxels in the set of voxels corresponding to the particular size (e.g., 5 mm). As discussed above, the probability for each voxel may be shifted to obtain a negative probability or a positive probability. Any voxel value that is less than the middle voxel value between the background voxel value (e.g., 0 HU) and the lesion voxel value (e.g., 100 HU) may have a negative probability value; and any voxel value that is greater than the middle voxel value between the background voxel value (e.g., 0 HU) and the lesion voxel value (e.g., 100 HU) may have a positive probability value. The shifted probabilities can then be normalized and summed to obtain the probability that the first 3D object has the particular size.

As another example, the first 3D object having a size of 7 mm may correspond to a set of voxels having voxel values that are greater than or equals 80 HU (e.g., voxels having values of 100, 97, and 80 HU). Similar to the above example, the probability of each voxel can be shifted and normalized. In some embodiments, based on the normalized probabilities of a particular set of voxels, which may correspond to a particular size (e.g., 7 mm) of the first 3D object, the computer system can calculate the probability (e.g., sum the shifted and normalized probabilities of voxels) that this particular set of voxels represent matters inside the first 3D object or outside the first 3D object. As a result, the computer system can determine the probability that the first 3D object has a particular value of a characteristic (e.g., a size) for different values (e.g., for size of 0 mm, 5 mm, 10 mm, 15 mm, etc.), and therefore determines the first PDF. FIG. 4B illustrates such a first PDF 420.

As shown in FIG. 4B, the computer system can provide first PDF 420 based on its calculation of the probabilities that the first 3D object has a particular value of a characteristic (e.g., a size) for different values. The horizontal axis of first PDF 420 represents the value of the characteristic of the first 3D object (e.g., the value of the size of a nodule). The vertical axis of first PDF 420 represents the probability that the first 3D object has a particular value of the characteristic for different values. For example, as shown in FIG. 4B, first PDF 420 indicates that the probability that the first 3D object has a size of 5 mm is approximately 6%; the probability that the first 3D object has a size of 10 mm is approximately 7%, so forth.

It is appreciated that the computer system can repeat process 400 for determining a PDF as many times as desired. And the computer system may do it in many different ways. Referring back to FIG. 3A, as discussed above, the computer system can determine (step 306) a second metric representing a distribution of probabilities with respect to values associated with the characteristic of the first 3D object at a second evaluation. The second evaluation can be, for example, an evaluation performed at a subsequent time point for the same patient from the first evaluation. The second evaluation may be used to determine whether the first 3D object (e.g., a nodule) has any variation (e.g., increased in size). In some embodiments, determining the second metric comprises determining a second PDF based on the second dataset obtained at the second evaluation. For determining the second PDF, the computer system can perform process 400 using the second dataset. The second dataset may include voxel values as illustrated, for example, in second voxel grid 340 shown in FIG. 3C.

Referring to FIG. 4A, for determining the second PDF, the computer system can determine (step 402) whether the second dataset includes a second set of background voxel values (e.g., 0 HU). The second set of background voxel values corresponds to portions of a second 3D object surrounding the first 3D object. Upon determining that the second dataset includes the second set of background voxel values, the computer system can generate (step 404) a second processed dataset based on the second dataset. The computer system can then determine (step 406) a normalized probability for each voxel having a corresponding voxel value included in the second processed dataset. In some embodiments, the computer system determines the second PDF in a substantially the same or similar manner as described above with respect to determining of the first PDF. Therefore, the details of determining the second PDF are not repeated.

Referring to FIG. 4B, the computer system can provide second PDF 440 based on its calculation of the probabilities that the first 3D object has a particular value of a characteristic (e.g., a size) for different values. The horizontal axis of second PDF 440 may represent the value of the characteristic of the first 3D object (e.g., the value of the size of a nodule). The vertical axis of second PDF 440 may represent the probability that the first 3D object has a particular value of the characteristic over a range of values. For example, as shown in FIG. 4B, second PDF 440 indicates that the probability that the first 3D object has a size of 5 mm is approximately 2.5%; the probability that the first 3D object has a size of 10 mm is approximately 5%, so forth.

FIG. 4A is merely illustrative of a method for determining a PDF. The illustrative discussions above are not intended to be exhaustive or to limit the invention to the precise form disclosed. Many modifications and variations are possible in view of the above teachings.

Figure 5A:
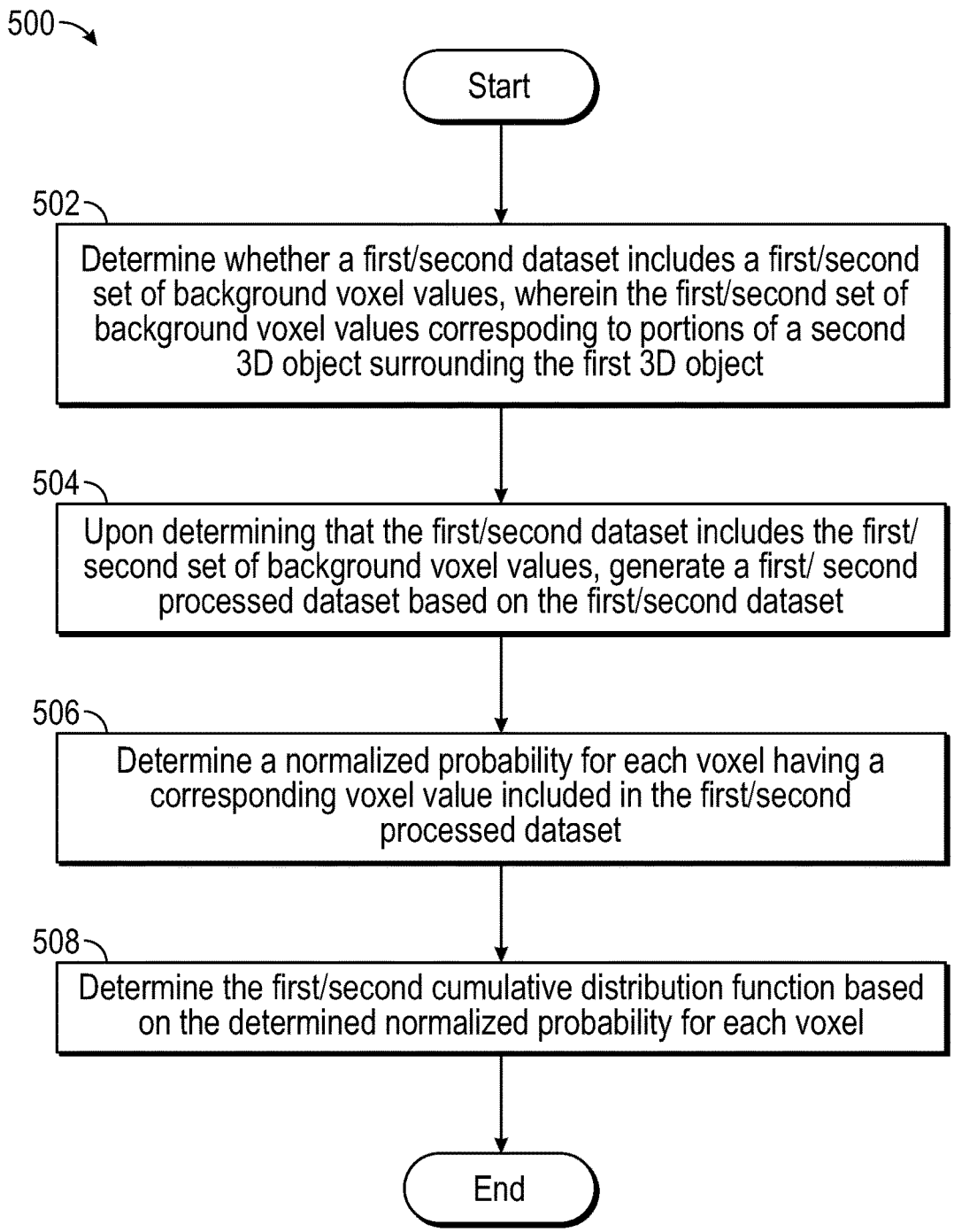
FIG. 5A illustrates a flow chart of an exemplary process for determining a cumulative distribution function, consistent with some embodiments of the present disclosure.

Referring back to FIG. 3A, after the computer system obtains the first dataset and the second dataset, it can determine (step 304) a first metric based on the first dataset and determine (step 306) a set metric based on the second dataset. In some embodiments, determining the first metric comprises determining a first cumulative distribution function (CDF) based on the first dataset; and determining the second metric comprises determining a second CDF based on the second dataset. FIG. 5A illustrates a flow chart of an exemplary process 500 for determining a CDF, consistent with some embodiments of the present disclosure. A CDF provides probabilities that the characteristic (e.g., size, area, or volume) of a first 3D object (e.g., a nodule) is less than or equal to corresponding values.

Referring to FIG. 5A, in process 500, for determining a CDF, a computer system (e.g., computer system 201) can determine probabilities that the characteristic of the first 3D object has corresponding values, and then determine the CDF based on the determined probabilities. For example, process 500 can include steps 502, 504, and 506 that are substantially the same as steps 402, 404, and 406 in process 400 for determining the a PDF. Steps 502, 504, and 506 are therefore not repeatedly described. In process 500, after determining the PDF, the computer system can determine (step 508) the CDF using, for example, running sum or integral of the PDF.

Figure 5B:
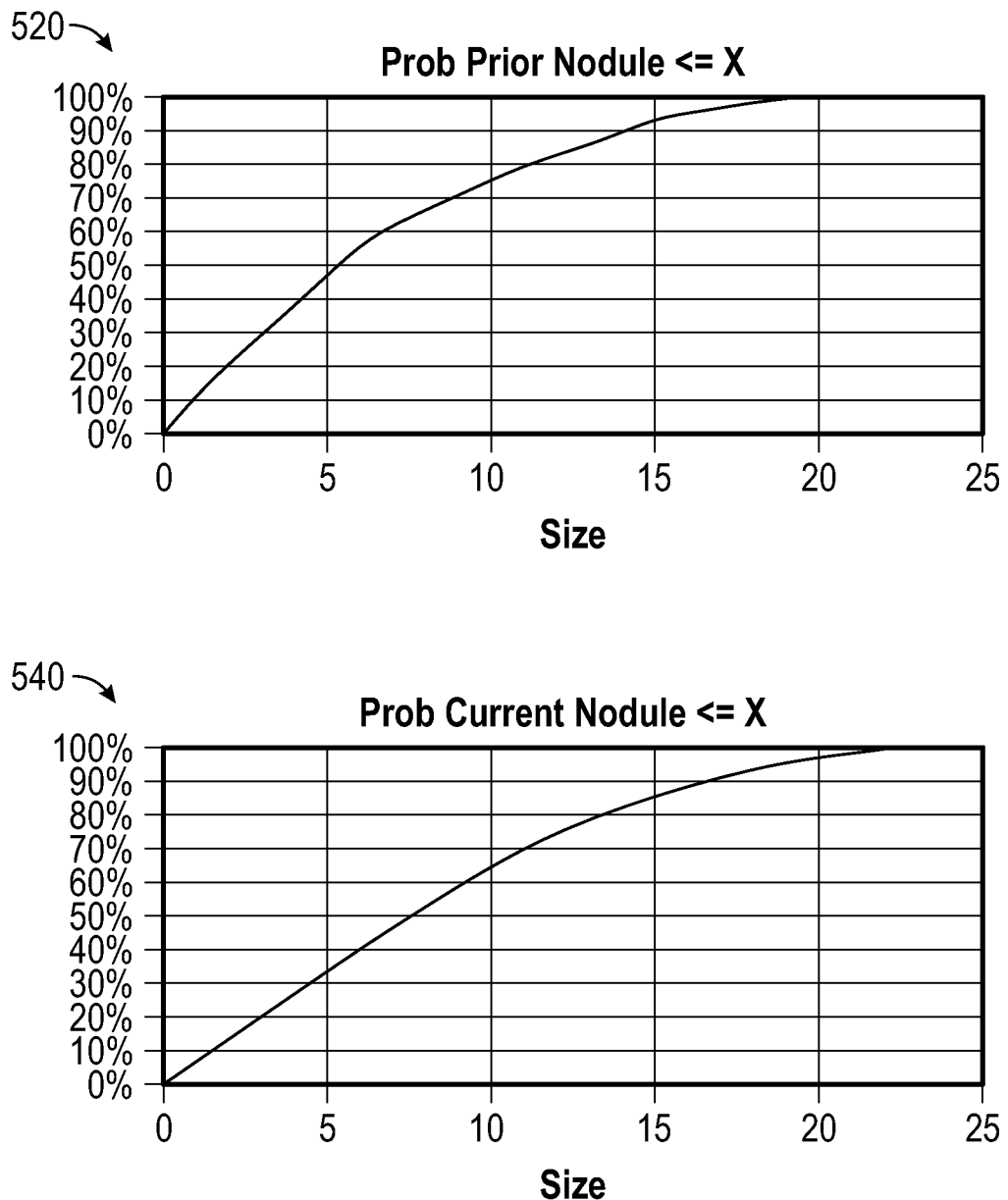
FIG. 5B illustrates exemplary first and second cumulative distribution functions determined based on the first dataset and the second dataset, respectively.

FIG. 5B illustrates exemplary first CDF 520 and second CDF 540 determined based on the first dataset and the second dataset, respectively. The first CDF 520 may be determined based on the first dataset obtained at the first evaluation of a patient; and the second CDF 540 may be determined based the second dataset obtained at the second evaluation of the patient. The second evaluation can be performed at a time point subsequent to the time point of the first evaluation. Referring to FIG. 5B, in both first CDF 520 and second CDF 540, the horizontal axis may represent the value of characteristic of the first 3D object (e.g., the value of the size of a nodule). The vertical axis may represent the probability that the characteristic of the first 3D object is less than or equal to a particular value over a range of values. For example, as shown in FIG. 5B, first CDF 520 indicates that the probability that the size of the first 3D object is less than or equal to 5 mm is approximately 48%; the probability that the size of the first 3D object is less than or equal to 10 mm is approximately 75%, so forth. And second CDF 540 indicates that the probability that the size of the first 3D object is less than or equal to 5 mm is approximately 35%; the probability that the size of the first 3D object is less than or equal to 10 mm is approximately 65%, so forth. For a CDF, the probability that the value of the characteristic of the first 3D object is less than or equal to a sufficiently large value (e.g., 25 mm) may approach 100%.

FIG. 5A is merely illustrative of a method for determining a CDF. The illustrative discussions above are not intended to be exhaustive or to limit the invention to the precise form disclosed. Many modifications and variations are possible in view of the above teachings.

As discussed above, determining a first metric, and similarly a second metric, may comprise determining PDFs or determining CDFs. In some embodiments, determining the first metric or the second metric may comprise determining distributions of probabilities based on a CDF and an inverse CDF. As discussed above, a CDF provides probabilities that a characteristic of the first 3D object (e.g., a nodule) is less than or equals corresponding values. An inverse CDF provides probabilities that a characteristic of the first 3D object is greater than or equals corresponding values. For example, an inverse CDF can provide that the probability that the size of a nodule is greater than or equals 5 mm is 90%, the probability that the size of a nodule is greater than or equals 10 mm is 75%, so forth. In some embodiments, based on the CDFs and the inverse CDF, the computer system can determine the first metric or the second metric by multiplying a probability value of the CDF corresponding to a particular value of the characteristic (e.g., the value of the size) of the first 3D object and a probability value of the inverse CDF corresponding to the same particular value of the characteristic (e.g., the value of the size) of the first 3D object. For example, the computer system can determine the first metric or the second metric by multiplying the probability value of a CDF corresponding to a 5 mm size and the probability value of an inverse CDF corresponding to a same 5 mm size; multiplying the probability value of a CDF corresponding to a 10 mm size and the probability value of an inverse CDF corresponding to a same 10 mm size, so forth.

Referring back to FIG. 3A, in some embodiments, after determining the first metric and the second metric, the computer system can provide (step 308) an assessment of the first 3D object variation between the first evaluation and the second evaluation. As discussed above, the first metric may represent a distribution of probabilities (e.g., a PDF) with respect to values associated with a characteristic of the first 3D object (e.g., values of a size of a nodule) at a first evaluation. The second metric may represent a distribution of probabilities (e.g., a PDF) with respect to values associated with a characteristic of the first 3D object (e.g., values of a size of a nodule) at a second evaluation.

Figure 6A:
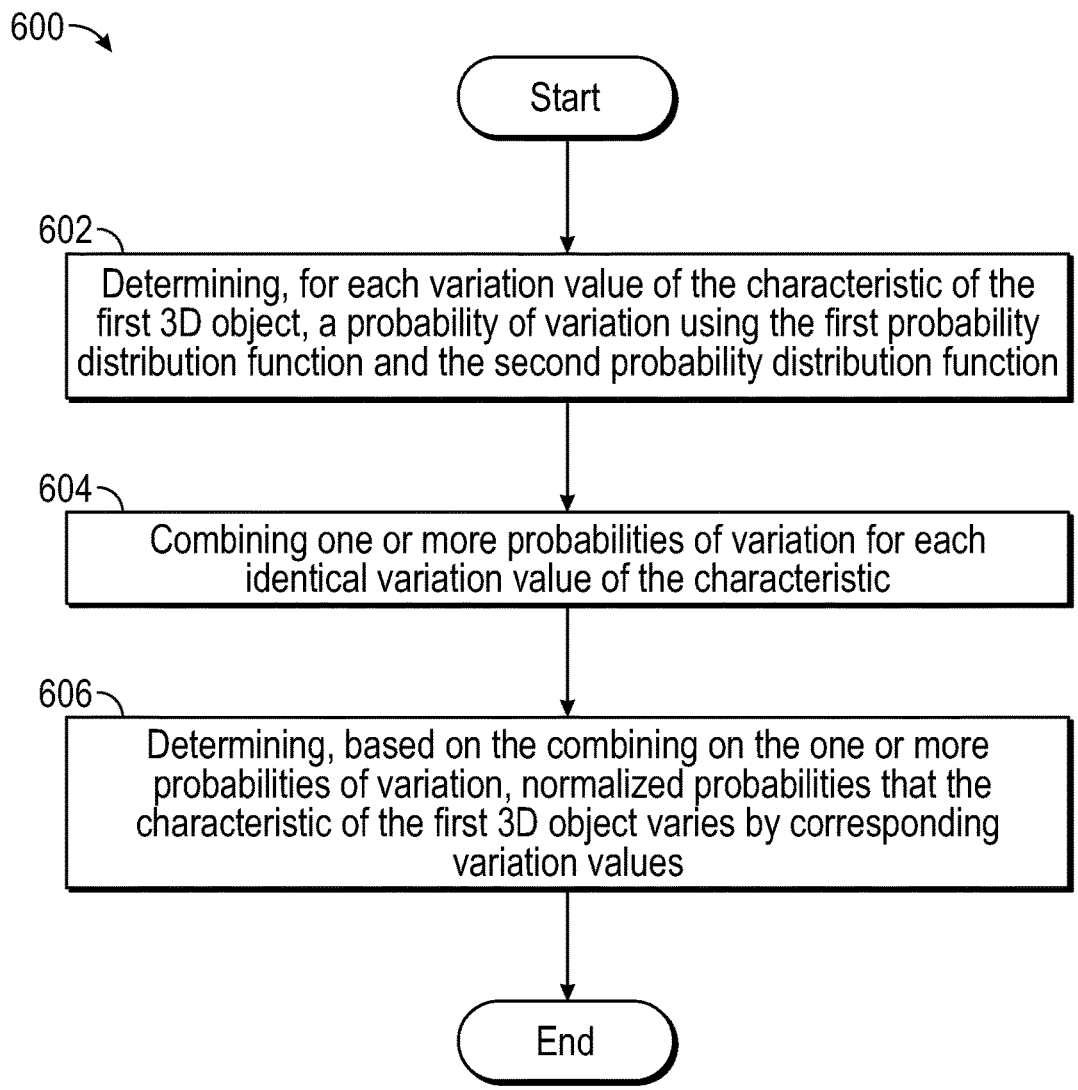
FIG. 6A illustrates a flow chart of an exemplary process for determining a probability variation distribution function of the first 3D object based on two probability distribution functions, consistent with some embodiments of the present disclosure.
Figure 6B:
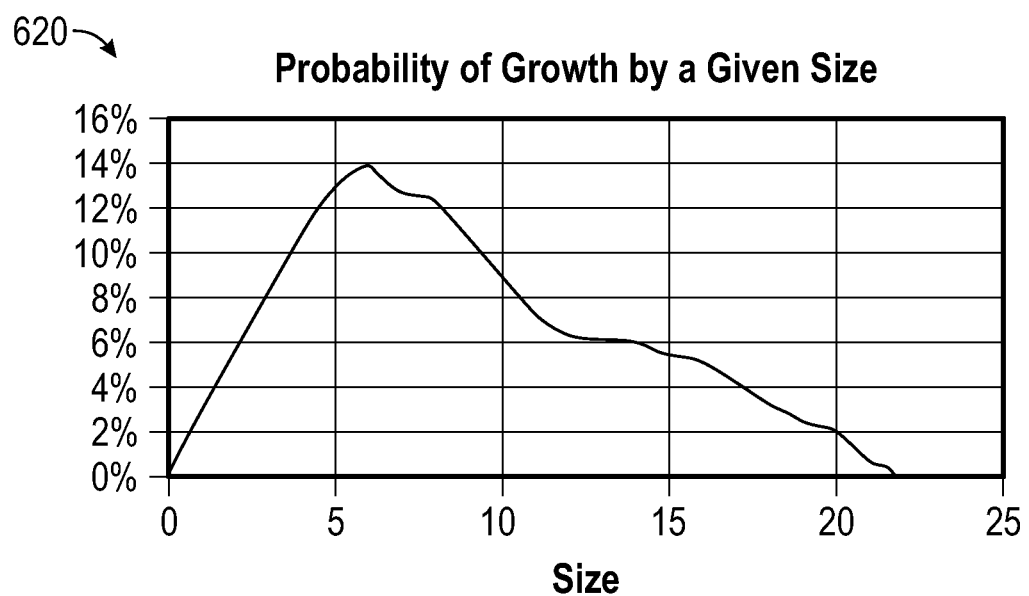
FIG. 6B illustrates an exemplary probability variation distribution function of a first 3D object.

In some embodiments, providing an assessment of the first 3D objection variation comprises determining a probability variation distribution function of the first 3D object based on the first PDF and the second PDF. FIG. 6A illustrates a flow chart of an exemplary process 600 for determining a probability variation distribution function based on PDFs, consistent with some embodiments of the present disclosure. FIG. 6B illustrates an exemplary probability variation distribution function 620 of the first 3D object. In some embodiments, for determining the probabilities of the first 3D object variation, the computer system can verify that the first metric (e.g., the first PDF) and the second metric (e.g., the second PDF) are finite in size. Further, the computer system can also verify that the first dataset, based on which the first metric is determined, and the second dataset, based on which the second metric is determined, are statistically independent (e.g., the voxel values of the first dataset are not considered or taking into account when the second dataset is obtained).

Referring to FIG. 6A, in some embodiments, the computer system can determine (step 602), for each value associated with the characteristic of the first 3D object, a probability of variation using a first PDF and a second PDF. As discussed above, the first PDF may provide probabilities that the characteristic (e.g., size) of the first 3D object has corresponding values at the first evaluation; and the second PDF may provide probabilities that the characteristic (e.g., size) of the first 3D object has corresponding values at the second evaluation. FIG. 4B illustrates examples of the first PDF and the second PDF.

As an example of determining the probabilities of variation using the first PDF and the second PDF, the computer system can calculate the probabilities of variation using formula (2) for each value of the characteristic (e.g., size) in the first PDF and for each value of the characteristic (e.g., size) in the second PDF.

PROBABILITY_OF_VARIATIONW=FIRST_PDF($i$)
 *SECOND_PDF($j$). Formula (2)

In formula (2), the FIRST PDF ($i$) represents the probability that the first 3D object has a characteristic($i$), as provided by the first PDF; the Second_PDF ($j$) represents the probability that the first 3D object has a characteristic($j$), as provided by the second PDF; and the PROBABILITY_OF_VARIATION($i$) represents the probability that a characteristic variation (e.g., a change of size) of a particular value (e.g., 5 mm) occurs. The "i" and "j" are indices, which may or may not be identical to each other. As an example, referring to FIGS. 4B and 6B, the first PDF 420 provides probabilities of sizes ranging from approximately 1 mm to 20 mm; the second PDF 440 provides probabilities of sizes ranging from approximately 1 mm to 29 mm. Using formula (2), the computer system can calculate that the probabilities that a characteristic variation of a particular value (e.g., a size variation of 5 mm) occurs for all values (e.g., all size variations).

Referring to FIG. 6A, in some embodiments, the computer system can combine (step 604) one or more probabilities of variation for each identical variation of the characteristic. For example, based on the calculation in step 602 using formula (2), the computer system may obtain one or more probabilities of variation that correspond to a same characteristic variation (e.g., one or more probabilities of variation correspond to a same size variation of 5 mm). In some embodiments, the computer system can sum the one or more probabilities of variation that correspond to a same characteristic variation (e.g., sum the probabilities of variation correspond to a same size variation of 5 mm).

In some embodiments, after combining the one or more probabilities of variation, the computer system can determine (step 606) normalized probabilities of variation with respect to values associated with the characteristic of the first 3D object. The computer system can then generate a probability variation distribution function. FIG. 6B illustrates such a probability variation distribution function 620. In probability variation distribution function 620, the horizontal axis may represent the size variation of the first 3D object (e.g., a nodule) between a first evaluation and a second evaluation. The vertical axis may represent the probability that the first 3D object has a particular size variation. For example, as shown in FIG. 6B, the probability that the first 3D object has a size variation of 5 mm is approximately 13%.

FIG. 6A is merely illustrative of a method for determining a probability variation distribution function. The illustrative discussions above are not intended to be exhaustive or to limit the invention to the precise form disclosed. Many modifications and variations are possible in view of the above teachings.

Referring back to FIG. 3A, for providing (step 308) an assessment of the first 3D object variation between the first evaluation and the second evaluation, the computer system can generate a probability variation distribution function based on a first metric that comprises a first CDF and a second metric that comprises a second CDF.

Figure 7:
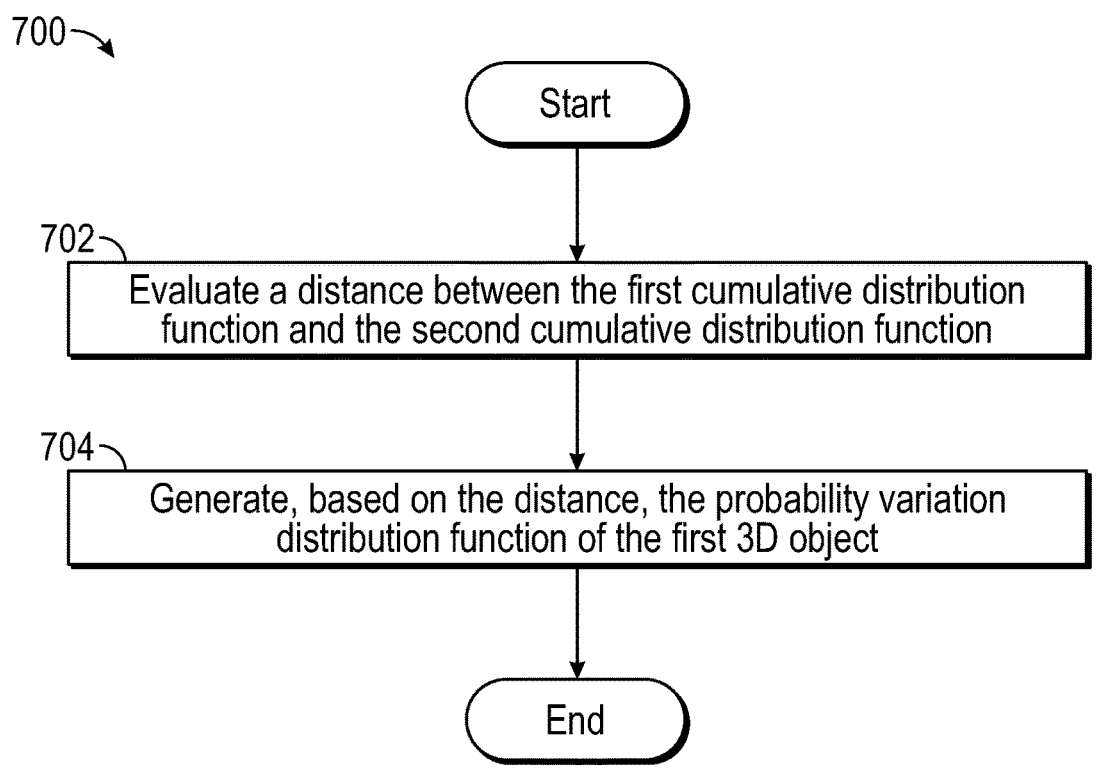
FIG. 7 a flow chart of an exemplary process for determining a probability variation distribution function of the first 3D object based on two cumulative distribution functions, consistent with some embodiments of the present disclosure.

FIG. 7 illustrates a flow chart of an exemplary process 700 for determining a probability variation distribution function of the first 3D object based on two CDFs, consistent with some embodiments of the present disclosure. In some embodiments, the computer system can evaluate (step 702) a distance between the first CDF (e.g., first CDF 520 as shown in FIG. 5B) and the second CDF (e.g., second CDF 540 as shown in FIG. 5B). For example, the computer system can evaluate the distance based on a Kolmogorov-Smirnov test (KS test) or a similar method. Based on the distance, the computer system can generate (step 704) the probability variation distribution function of the first 3D object. In some embodiments, the computer system can also provide all probability variation values instead of summing the differences and normalizing.

FIG. 7 is merely illustrative of a method for determining a probability variation distribution function based on two CDFs. The illustrative discussions above are not intended to be exhaustive or to limit the invention to the precise form disclosed. Many modifications and variations are possible in view of the above teachings.

Further, it is appreciated that the computer system may determine the probability variation distribution function based on any desired methods, such as methods of statistical distance or divergence (e.g., P-values, KS test, f-Divergence, Energy Distance, Total Variation Distance, etc.).

Using the probability variation distribution function (e.g., probability variation distribution function 620), the computer system can provide the user an improved and more accurate assessment of the characteristic variation of the first 3D object (e.g., variation of the size of a nodule). Rather than providing an arbitrary number representing the characteristic of the first 3D object, which can be inaccurate, the probability variation distribution function may provide the user a range of probabilities over possible variations of a characteristic (e.g., possible size changes). As a result, the user can better determine, with an improved accuracy, whether a first 3D object (e.g., a nodule) has varied over time and may thus require further medical procedures.

Referring back to FIG. 3A, after providing the assessment of the first 3D object variation between the first evaluation and the second evaluation, process 300 may proceed to an end. FIG. 3A is merely illustrative of a method for variation assessment. The illustrative discussions above are not intended to be exhaustive or to limit the invention to the precise form disclosed. Many modifications and variations are possible in view of the above teachings.

It should be noted that, despite references to particular computing paradigms and software tools herein, the computer program instructions with which embodiments of the present subject matter may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, references to particular algorithms herein are merely by way of examples. Suitable alternatives or those later developed known to those of skill in the art may be employed without departing from the scope of the subject matter in the present disclosure.

It will be understood that, although the terms "first," "second," etc. may be used herein to describe various elements, these elements should not be limited by these terms. These terms are only used to distinguish one element from another. For example, a first 3D object could be termed a second 3D object, and, similarly, a second 3D object could be termed a first 3D object, without changing the meaning of the description, so long as all occurrences of the "first 3D object" are renamed consistently and all occurrences of the "second 3D object" are renamed consistently. The first 3D object and the second 3D object are both 3D objects, but they are not the same 3D objects.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

The invention claimed is:

1. A computer-implemented method for variation assessment of a first three-dimensional (3D) object, comprising:
    at a computer system including one or more processors and memory,
    obtaining a first dataset and a second dataset, the first dataset representing data associated with a first scan of the first 3D object and the second dataset representing data associated with a second scan of the first 3D object;
    determining a first metric based on the first dataset, the first metric representing a distribution of probabilities with respect to values associated with a characteristic of the first 3D object at the first scan;
    determining a second metric based on the second dataset, the second metric representing a distribution of probabilities with respect to values associated with the characteristic of the first 3D object at the second scan; and
    providing, based on the first metric and the second metric, an assessment of the first 3D object variation between the first scan and the second scan.

2. The method of claim 1, wherein the first 3D object is at least one of: an abnormality of a human body or an animal body, an aggregation of cells, a nodule, and a tumor.

3. The method of claim 1, wherein the first 3D object is a portion of a second 3D object, the second 3D object being a portion of a human body, a portion of an animal body, or a lifeless object.

4. The method of claim 1, wherein the first dataset comprises a plurality of voxel values generated at the first scan, and the second dataset comprises a plurality of voxel values generated at the second scan.

5. The method of claim 4, wherein the voxel values are density values.

6. The method of claim 1, wherein determining the first metric comprises determining a first probability distribution function (PDF) based on the first dataset; and determining the second metric comprises determining a second probability distribution function (PDF) based on the second dataset.

7. The method of claim 6, wherein
    the first PDF provides probabilities that the characteristic of the first 3D object has corresponding values at the first scan; and
    the second PDF provides probabilities that the characteristic of the first 3D object has corresponding values at the second scan.

8. The method of claim 6, wherein determining the first PDF comprises:
    determining whether the first dataset includes a first set of background voxel values, wherein the first set of background voxel values corresponds to portions of a second 3D object surrounding the first 3D object;
    upon determining that the first dataset includes the first set of background voxel values, generating a first processed dataset based on the first dataset;
    determining a normalized probability for each voxel having a corresponding voxel value included in the first processed dataset; and
    generating the first PDF based on the determined normalized probability for each voxel.

9. The method of claim 8, wherein generating the first processed dataset based on the first dataset comprises:
    sorting voxel values of a plurality of voxels included in the first dataset;
    removing one or more voxel values that are greater than a first threshold voxel value; and
    removing one or more voxel values that are less than a second threshold voxel value.

10. The method of claim 8, wherein determining the normalized probability for each voxel having a corresponding voxel value included in the first processed dataset comprises:
 determining a probability for each voxel based on the corresponding voxel value included in the first processed dataset;
 shifting the probability for each voxel; and
 determining a normalized probability for each voxel based on the shifted probability of the corresponding voxel.

11. The method of claim 6, wherein determining the second PDF comprising:
 determining whether the second dataset includes a second set of background voxel values, wherein the second set of background voxel values corresponding to portions of a second 3D object surrounding the first 3D object;
 upon determining that the second dataset includes the second set of background voxel values, generating a second processed dataset based on the second dataset;
 determining a normalized probability for each voxel included in the second processed dataset; and
 generating the second PDF based on the determined normalized probability for each voxel.

12. The method of claim 11, wherein generating the second processed dataset based on the second dataset comprises:
 sorting voxel values of a plurality of voxels included in the second dataset;
 removing, based on the sorted voxel values, one or more voxel values that are greater than a first threshold voxel value; and
 removing, based on the sorted voxel values, one or more voxel values that are less than a second threshold voxel value.

13. The method of claim 11, wherein determining the normalized probability for each voxel included in the second processed dataset comprises:
 determining a probability for each voxel based on the voxel values of the voxels included in the second processed dataset;
 shifting the probability for each voxel; and
 determining a normalized probability for each voxel based on the shifted probability of the corresponding voxel.

14. The method of claim 1, wherein determining the first metric comprises determining a first cumulative distribution function (CDF) based on the first dataset; and determining the second metric comprises determining a second cumulative distribution function (CDF) based on the second dataset.

15. The method of claim 14, wherein
 the first CDF provides probabilities that the characteristic of the first 3D object is less than or equals corresponding values at the first scan; and
 the second CDF provides probabilities that the characteristic of the first 3D object is less than or equals corresponding values at the second scan.

16. The method of claim 14, wherein determining the first CDF comprising:
 determining whether the first dataset includes a first set of background voxel values, wherein the first set of background voxel values corresponds to portions of a second 3D object surrounding the first 3D object;
 upon determining that the first dataset includes the first set of background voxel values, generating a first processed dataset based on the first dataset;
 determining a normalized probability for each voxel having a corresponding voxel value included in the first processed dataset; and
 determining the first cumulative distribution function based on the determined normalized probability for each voxel.

17. The method of claim 14, wherein determining the second CDF comprising:
 determining whether the second dataset includes a second set of background voxel values, wherein the second set of background voxel values corresponds to portions of a second 3D object surrounding the first 3D object;
 upon determining that the second dataset includes the second set of background voxel values, generating a second processed dataset based on the second dataset;
 determining a normalized probability for each voxel included in the second processed dataset; and
 determining the second CDF based on the determined normalized probability for each voxel.

18. The method of claim 1, wherein providing the assessment of the first 3D object variation between the first scan and the second scan comprises:
 determining, based on a first metric and second metric, a probability variation distribution function of the first 3D object, wherein the first metric comprises a first probability distribution function (PDF) and the second metric comprising a second probability distribution function (PDF).

19. The method of claim 18, wherein determining the probability variation distribution function of the first 3D object comprises:
 determining, for each variation value of the characteristic of the first 3D object, a probability of variation using the first PDF and the second PDF;
 combining one or more probabilities of variation for each identical variation value of the characteristic; and
 determining, based on the combining of the one or more probabilities of variation, normalized probabilities that the characteristic of the first 3D object varies by corresponding variation values.

20. The method of claim 1, wherein providing the assessment of the first 3D object variation between the first scan and the second scan comprises:
 determining, based on the first metric and the second metric, a probability variation distribution function of the first 3D object, wherein the first metric comprises a first cumulative distribution function (CDF) and the second metric comprises a second cumulative distribution function (CDF).

21. The method of claim 20, wherein determining the probability variation distribution function of the first 3D object comprises:
 evaluating a distance between the first CDF and the second CDF;
 generating, based on the distance, the probability variation distribution function of the first 3D object.

22. The method of claim 1, wherein the characteristic of the first 3D object includes a linear diameter of a two-dimensional (2D) slice that intersects the first 3D object, a maximum diameter of the first 3D object, a maximum area of a 2D slice that intersects the first 3D object, or a volume of the first 3D object.

23. The method of claim 1, wherein the second scan is performed after performing the first scan.

24. The method of claim 1, wherein the second scan is performed at a subsequent time to the first scan.

25. The method of claim 1, wherein the first scan and second scan are different CT scans.

26. The method of claim 1, wherein the first scan and second scan are different MM scans.

27. A non-transitory computer readable medium having instructions stored thereon, the instructions, when executed by one or more processors of a computer system, cause the computer system to:
- obtain a first dataset and a second dataset, the first dataset representing data associated with a first scan of the first 3D object and the second dataset representing data associated with a second scan of the first 3D object;
- determine a first metric based on the first dataset, the first metric representing a distribution of probabilities with respect to values associated with a characteristic of the first 3D object at the first scan;
- determine a second metric based on the second dataset, the second metric representing a distribution of probabilities with respect to values associated with the characteristic of the first 3D object at the second scan; and
- provide, based on the first metric and the second metric, an assessment of the first 3D object variation between the first scan and the second scan.

28. A system for variation assessment of a first three-dimensional (3D) object, comprising:
- one or more processors; and
- memory having instructions stored thereon, the instruction, when executed by the one or more processors, cause the computer system to:
- obtain a first dataset and a second dataset, the first dataset representing data associated with a first scan of the first 3D object and the second dataset representing data associated with a second scan of the first 3D object;
- determine a first metric based on the first dataset, the first metric representing a distribution of probabilities with respect to values associated with a characteristic of the first 3D object at the first scan;
- determine a second metric based on the second dataset, the second metric representing a distribution of probabilities with respect to values associated with the characteristic of the first 3D object at the second scan; and
- provide, based on the first metric and the second metric, an assessment of the first 3D object variation between the first scan and the second scan.

* * * * *